United States Patent
Witt

(10) Patent No.: US 10,304,150 B2
(45) Date of Patent: May 28, 2019

(54) APPARATUS AND METHOD FOR PROTECTING REAL-TIME SAFETY AND SECURITY RELEVANT VIDEO DATA

(71) Applicant: Maxim Integrated Products, Inc., San Jose, CA (US)

(72) Inventor: Kevin J. Witt, Colorado Springs, CO (US)

(73) Assignee: MAXIM INTEGRATED PRODUCTS, INC., San Jose, CA (US)

(*) Notice: Subject to any disclaimer, the term of this patent is extended or adjusted under 35 U.S.C. 154(b) by 33 days.

(21) Appl. No.: 15/609,078

(22) Filed: May 31, 2017

(65) Prior Publication Data

US 2017/0345118 A1 Nov. 30, 2017

Related U.S. Application Data

(60) Provisional application No. 62/343,374, filed on May 31, 2016.

(51) Int. Cl.
*G06K 9/00* (2006.01)
*G06T 1/00* (2006.01)

(52) U.S. Cl.
CPC .......... *G06T 1/0021* (2013.01); *G06T 1/0064* (2013.01); *G06T 1/0085* (2013.01); *G06T 2201/0051* (2013.01)

(58) Field of Classification Search
CPC ... G06T 1/0021; G06T 1/0064; G06T 1/0085; G06T 2201/0051
See application file for complete search history.

(56) References Cited

U.S. PATENT DOCUMENTS

| | | | | |
|---|---|---|---|---|
| 6,064,737 A | * | 5/2000 | Rhoads | G06F 21/445 380/252 |
| 6,546,113 B1 | * | 4/2003 | Lucas | G06T 1/0085 382/100 |
| 8,401,331 B2 | * | 3/2013 | Sherif | G06T 7/0004 382/100 |
| 9,088,801 B2 | * | 7/2015 | Nagel | H04N 19/89 |

(Continued)

FOREIGN PATENT DOCUMENTS

| | | | | |
|---|---|---|---|---|
| EP | 2254039 A1 | | 11/2010 | |
| JP | 2005236756 | * | 9/2005 | .......... H04N 19/467 |
| KR | 20120068084 | * | 6/2012 | ............. G06T 1/005 |

*Primary Examiner* — Amara Abdi
(74) *Attorney, Agent, or Firm* — Kevin E. West; Advent, LLP

(57) ABSTRACT

A system for generating and detecting watermarks within a video frame (e.g., video content) is described to determine whether a data interruption has occurred. In one or more implementations, the system includes a generation module communicatively coupled to a video source and a watermark detection module configured to receive a plurality of video watermarks. The watermarking detection module is configured to determine whether a watermark embedded in a current (e.g., a second) video frame is different from a watermark embedded in the previous (e.g., a first) video frame. The watermarking detection module is configured to generate an error signal when the watermark embedded in the current (e.g., a second) video frame is not different than the watermark embedded in the previous (e.g., a first) video frame to indicate a data interruption event has occurred.

19 Claims, 6 Drawing Sheets

(56) References Cited

U.S. PATENT DOCUMENTS

| | | | |
|---|---|---|---|
| 2002/0049569 A1* | 4/2002 | Lenoir | G06F 12/1408 702/189 |
| 2002/0076084 A1* | 6/2002 | Tian | G06T 1/0042 382/100 |
| 2005/0031160 A1* | 2/2005 | Shaked | G06T 1/005 382/100 |
| 2005/0100671 A1* | 5/2005 | Kawada | G06T 1/0028 427/256 |
| 2006/0072780 A1* | 4/2006 | Zarrabizadeh | G06T 1/0028 382/100 |
| 2007/0071282 A1* | 3/2007 | Isogai | G06T 1/0085 382/100 |
| 2007/0223778 A1* | 9/2007 | Hobson | G06T 1/0085 382/100 |
| 2010/0172539 A1* | 7/2010 | Sugimoto | G06T 1/005 382/100 |
| 2013/0259294 A1* | 10/2013 | Mehta | G06T 1/0028 382/100 |
| 2013/0301872 A1* | 11/2013 | Flaharty | H04N 5/913 382/100 |
| 2014/0047475 A1* | 2/2014 | Oh | H04N 21/4355 725/40 |
| 2016/0316098 A1* | 10/2016 | Reed | G06T 1/0028 |

\* cited by examiner

APPARATUS AND METHOD FOR PROTECTING REAL-TIME SAFETY AND SECURITY RELEVANT VIDEO DATA

BACKGROUND

A digital watermark can include a marker embedded in a noise-tolerant signal, for example audio, video, or image data. Often, a digital watermark is covertly embedded or hidden within a carrier signal where the hidden watermark is related to the signal. A digital watermark is often detectable under certain conditions, such as when using a specific algorithm. A digital watermark can be used for tracing copyright infringement, video authentication, content management on a social network, source tracking, or for broadcast monitoring.

DRAWINGS

The detailed description is described with reference to the accompanying figures. The use of the same reference numbers in different instances in the description and the figures may indicate similar or identical items.

DETAILED DESCRIPTION

Overview

Figure 1:
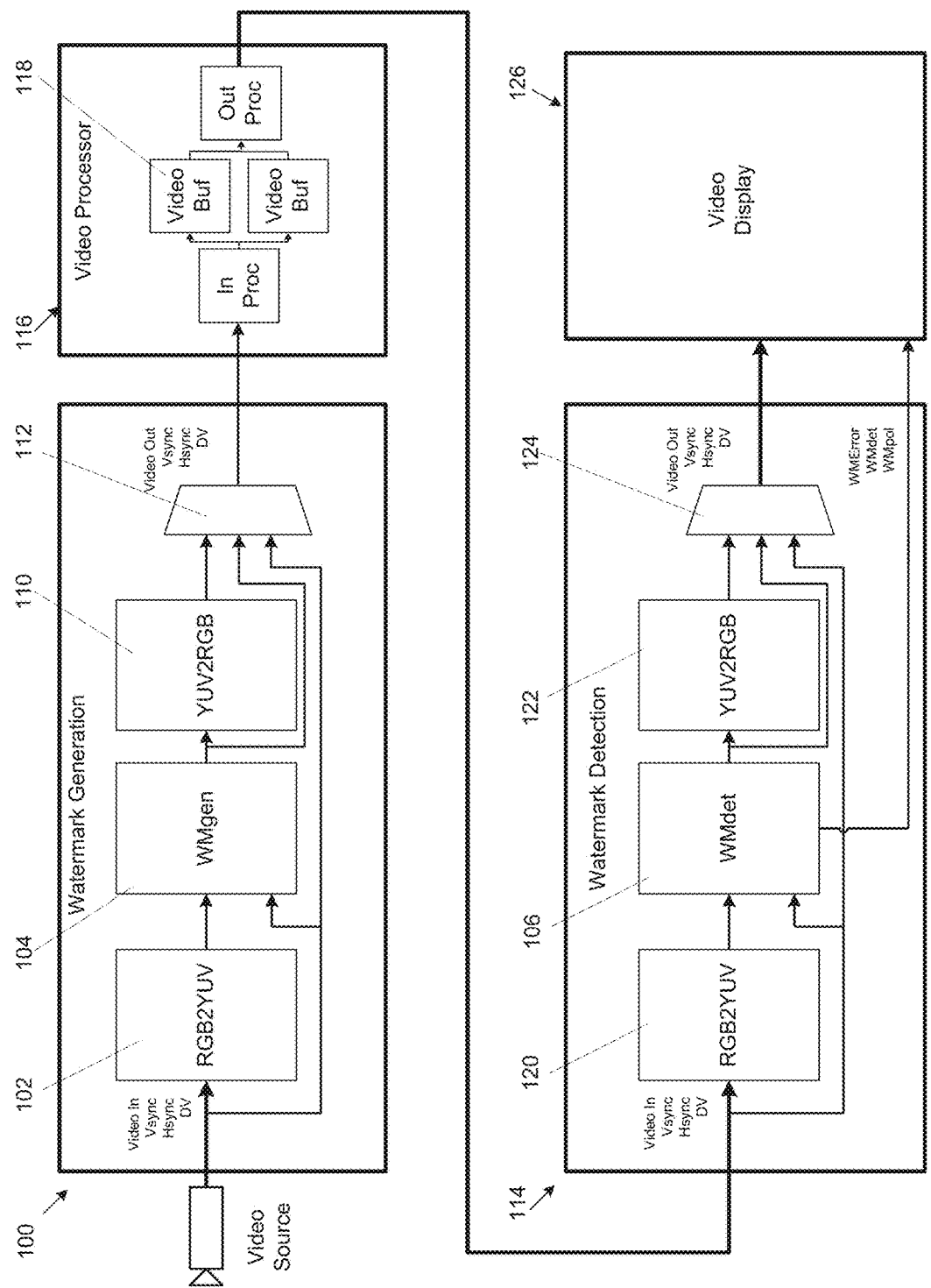
FIG. 1 is a block diagram illustrating a system for embedding (e.g., inserting) and detecting a watermark into video stream in accordance with an example implementation of the disclosure.

Digital watermarking of video content is the process of encoding auxiliary information into a digital representation of the video content, which can later be used to identify the content. As described herein, digital watermarking (e.g., watermarking) can be utilized to identify relevant video data (e.g., video of interest), and, if the video is identified as relevant, whether a data interruption (e.g., "frozen" video) has occurred. If a data interruption has occurred, the presently disclosed system can interrupt a processor and/or interrupt display of the video at a display.

One technique that uses digital watermarking can include inserting at least one unique frame counter in an image, usually in a corner pixel. However, this technique is vulnerable to image processing that will modify the image, where the processing modifies the digital values (e.g., filtering) or eliminates parts of the image (e.g., cropping). Another digital watermarking technique includes computing the cyclic redundancy check (CRC) of each frame or component of a frame. This technique may product false alarms for static images at a display, such as a GPS feed. A third digital watermarking technique could use a frequency domain watermark with security keys and potentially an embedded frame counter for detecting a freeze frame occurrence. However, this technique is computationally expensive.

Accordingly, a system for generating and detecting a time varying watermark within a video stream (e.g., video content) is described to determine whether a data interruption has occurred. In one or more implementations, the system includes a watermarking detection module configured to receive a plurality of video watermarks. The watermark detection module is configured to determine whether a watermark embedded in a current (e.g., a second) video frame is different from a watermark embedded in a previous (e.g., a first) video frame. The watermarking detection module is configured to generate an error signal when the watermark embedded in the current (e.g., the second) video frame is not different from the watermark embedded in the previous (e.g., the first) video frame to indicate a data interruption event has occurred. In some implementations, the watermark(s) may be embedded within one or more least significant bits of the Chroma portion of a video frame.

The system and methods described herein for digital watermarking are immune to most image processing. The spatial watermark is oversampled so that if the image is resized, the basis function can still be detected in an enlarged or a reduced image. The filtering and data recovery circuit(s) (DLL) enable detection with image resizing. Oversampling also enables the system to be immune to image rotation. Additionally, the spatial watermark is highly symmetric and highly redundant. The symmetry of the watermark enables immunity to vertical or horizontal flipping of the image, and the redundancy assists with cropping and video overlays. Moreover, the spatial watermark is much shorter than a typical image row and is repeated on every row. Thus, each image has typically thousands of copies of the watermark, this redundancy makes the image immune from image cropping. Additionally, the redundancy is augmented with a configurable gain and oversampling rate, which enables the system to be immune to video compression (e.g., display stream compression (DSC)) and image enhancement processing, such as sharpening and contrast adjustments.

The output processing of the system leverages the redundancy to filter the detections of a changing watermark. The detection processing step includes row and frame-based processing. The matched filter thresholding minimizes false alarms, and the watermark detection counters enable reliable frame-based dissemination of which basis function was detected. Additionally, frame-based processing enables frozen frame and frozen processor frame buffering.

Additionally, the system described herein is hardware efficient unlike other systems that utilize frequency domain watermarking and require image buffers and complex digital processing. The system herein does not require line or frame buffers and also maps well to pipeline digital processing.

Example Implementations

FIG. 1 illustrates a block diagram of an example system 100 for watermarking video data and an example system 114 for detection of the watermark. The lack of a video frame to frame change in watermark is used to detect a data interruption (e.g., "frozen" data). For example, the system 114, as described herein, is configured to detect data interruption of a video stream (e.g., video data). For instance, if video data generated at a vehicle's back-up camera (e.g., image capture device) were interrupted (e.g., "frozen") and the vehicle's operator was not informed, an accident may result. In another example, if video data generated at surveillance camera were interrupted (e.g., "frozen"), the interrupted video data would result in an ineffective video surveillance system. In one or more implementations, the system 100 is configured to encode (e.g., embed) the video data with at least two different watermarking patterns.

As shown in FIG. 1, the system 100 includes a conversion module 102. In one or more implementations, the conversion module 102 that is communicatively coupled to one or more image capture devices (e.g., cameras or other video source). The one or more image capture devices are configured to generate data representing images captured by the image capture devices. For instance, the image capture devices may be configured to generate video data (e.g., video frames). As described herein, the system 100 is configured to encode the captured video data with at least two watermark patterns that are different on alternating frames such that the system 114 can determine whether there is a data interruption. In an example implementation, the image capture device(s) are configured to capture video data that comprises Red Green Blue (RGB) video data (e.g., data representing video frames). Thus, the image capture devices 102 generate video data (e.g., video frame data) that comprises a RGB video data portion, a control data portion that comprises frame and/or line synch data (e.g., VSYNCH, HSYNCH), and a data valid portion. The conversion module 102 is configured to convert the RGB video data (e.g., RGB video frames) to YUV color space. For example, the conversion module 102 is configured to convert RGB video data to corresponding YUV video data. It is understood that optional YUV input video can be supported by the system 100 and 114 as well. For example, the processing disclosed herein can be performed in the RGB and/or the YUV color space.

The system 100 includes a watermarking generation module 104 for generating and embedding a watermark into the corresponding YUV video data. In one or more implementations, the watermarking generation module 104 is configured to replace the least significant bits (LSBs) of the Chroma portion (U or V) of the YUV video data with the watermark bit stream. The basis function comprises a digital bit pattern that is utilized to generate the watermark. In one or more implementations, multiple watermark basis functions can be utilized having changing polarity characteristics. The basis function may be oversampled to add redundancy and reduce the frequency content, and the number of LSBs to replace can serve as gain control.

Figure 2:
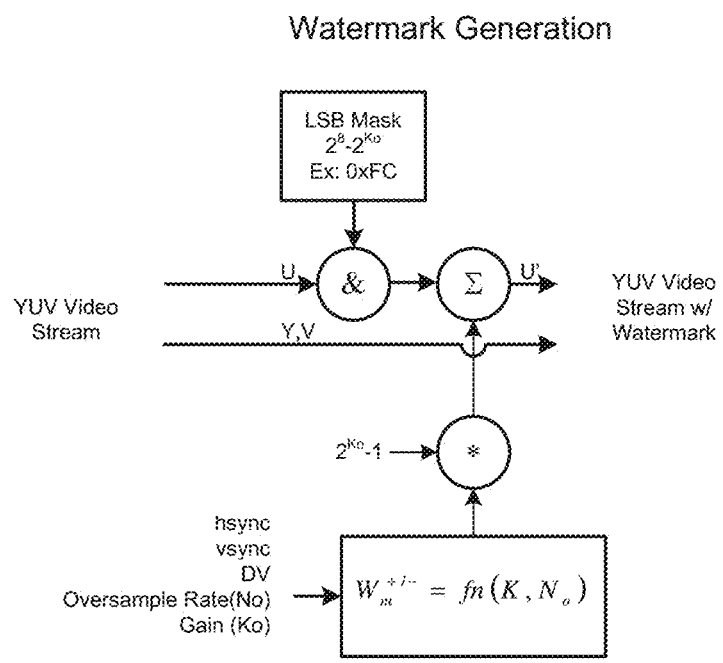
FIG. 2 is a block diagram illustrating watermark generation circuitry in accordance with an example implementation of the disclosure.
Figure 3:
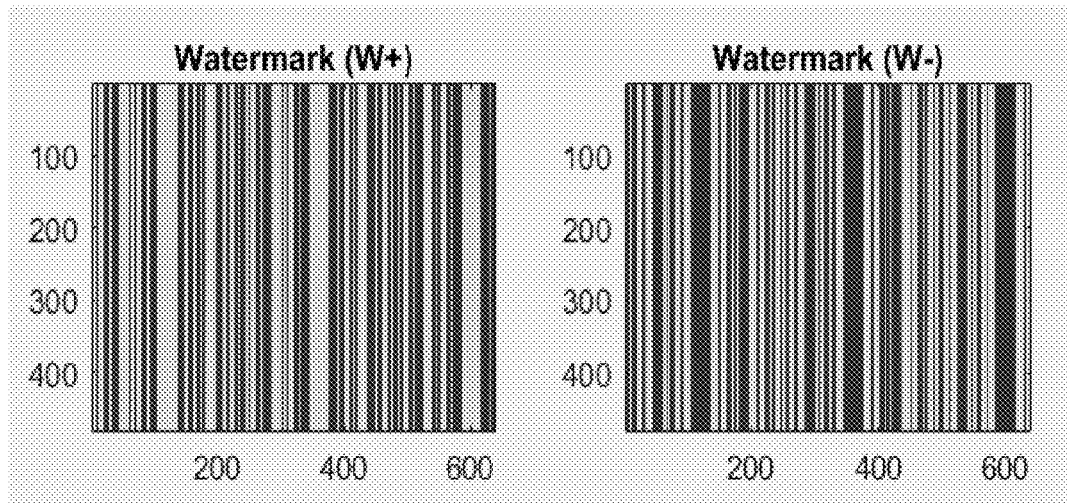
FIG. 3 is a diagrammatic illustration of an example watermark embedded into a video stream in accordance with an example implementation of the disclosure.
Figure 4:
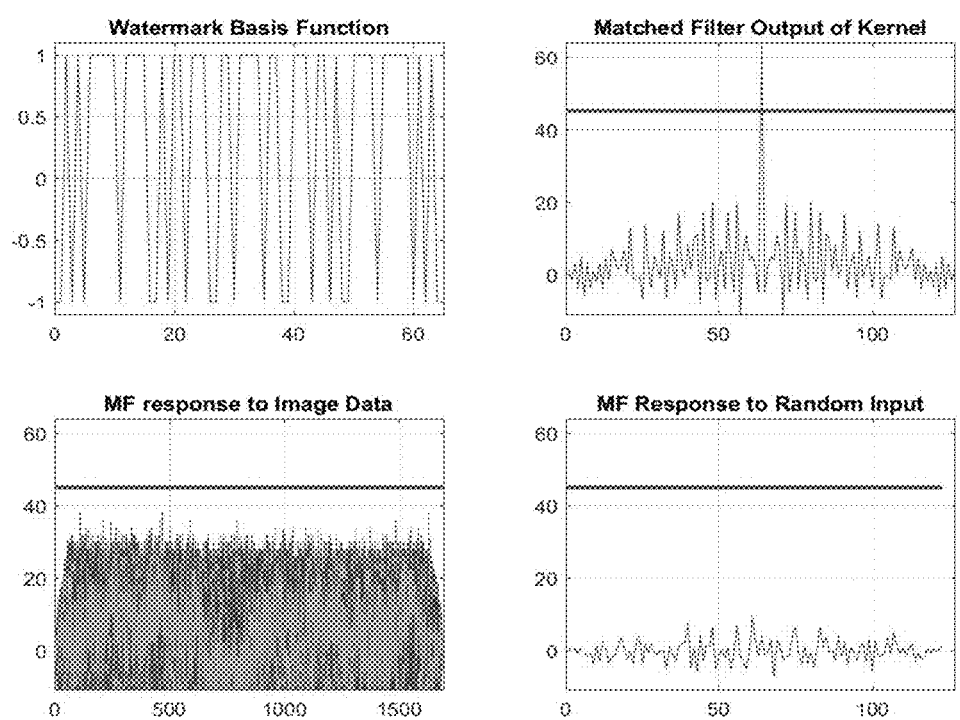
FIG. 4 are diagrammatic illustrations of an example watermark basis function for generating a watermark and the detection filter's responses based upon the watermark basis function.

FIG. 2 illustrates a block diagram illustrating watermark generation (via the watermarking generation module 104) in accordance with an example implementation of the present disclosure. In one or more implementations, a least significant bit mask is applied to the Chroma data portion. The watermark may be based upon a random bit pattern that is concatenated with a time reversed version to make the watermark time symmetric (see FIG. 3 for an example embedded [e.g., inserted] watermark). FIG. 3 illustrates an example watermark having a positive polarity and a negative polarity. As shown, the watermark is horizontally and vertically symmetric. In addition, the watermark is redundant within and across rows (see FIG. 3). In some implementations, the watermark may be restarted at each HSYNC. As such, the watermark may be redundant and symmetric both horizontally and vertically. The present disclosure enables the watermark to be robust to image processing that flips or rotates an image when combined with oversampling. FIG. 4 illustrates an example watermark basis function and example responses based upon the example watermark basis function. For instance, the watermark basis function illustrated in FIG. 4 comprises a "PRBS-5" based 64-bit fixed pattern with time symmetry.

Figure 5:
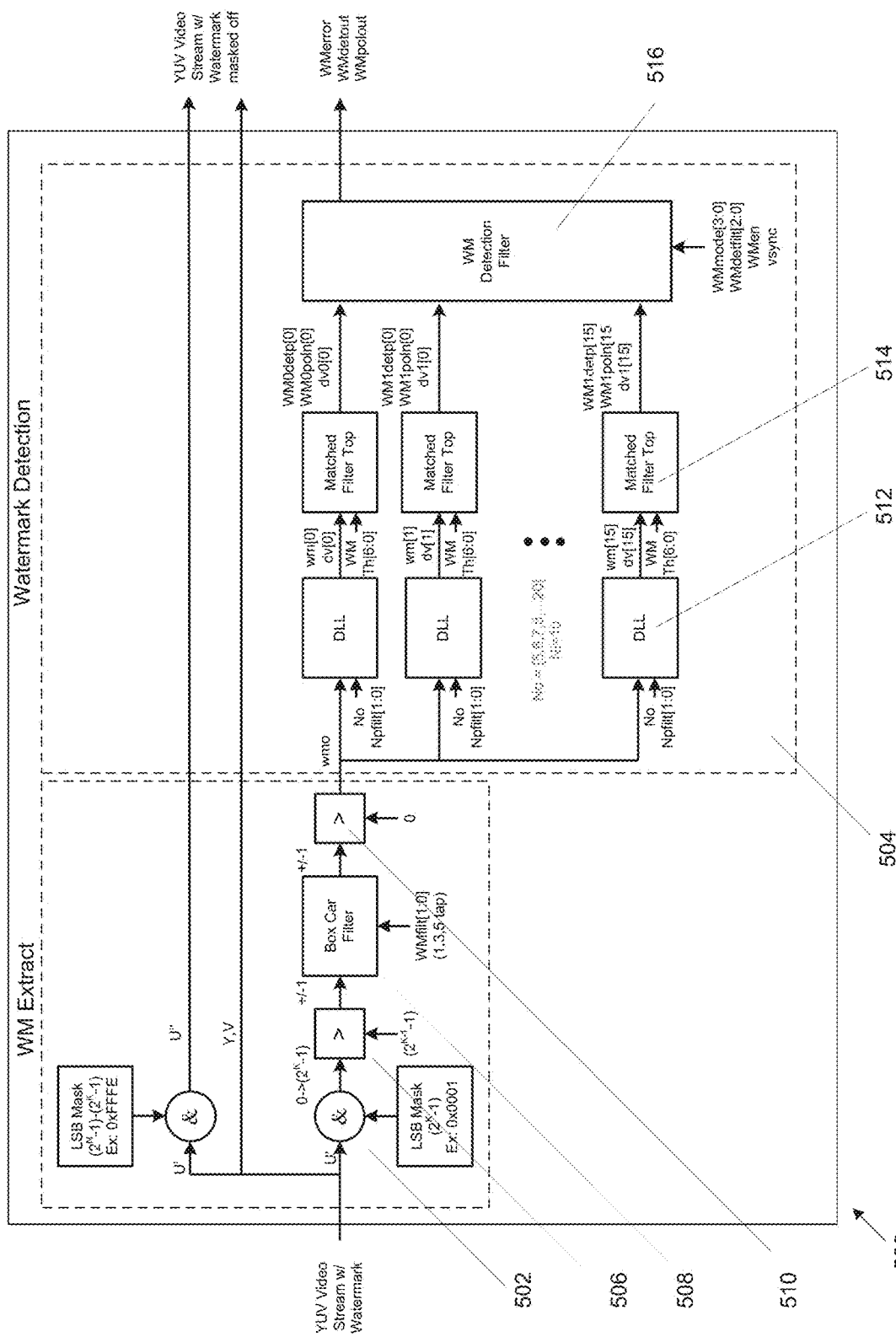
FIG. 5 is a block diagram illustrating watermark extraction and detection circuitry in accordance with an example implementation of the disclosure.

In one or more implementations, as shown in FIG. 5, the watermark detector 500 extracts the watermark from the LSBs of the Chroma portion of the YUV video data 502 and detects with a filter via the watermarking detection module 504 (e.g., the U or Y component). For instance, the filter may comprise a matched filter. In some implementations, the filter comprises a Finite Impulse Response (FIR) filter configured (e.g., optimized to) to the expected watermark. The output of the filter can be compared to a programmable threshold to minimize incorrect comparisons.

In one or more implementations, multiple watermark basis functions can be utilized and the polarity of the watermark can be changed every video frame, which will allow the system 114 to detect frozen video data caused by a video processing system 116 utilizing multiple frame buffers 118 within a system on a chip (SOC). The watermarking detection module 114 can also determine where the respective video frame is relevant (e.g., security related video frame, etc.) based upon the inclusion (or absence) of the watermark within the video frame. The watermarking detection module 114 is configured to continually monitor the video frames to determine whether a data interruption has occurred by continually monitoring the watermark and the temporal changes of the watermark. The watermarking detection module 114 is configured to generate an error signal if the video is determined to be relevant (e.g., video includes a watermark) and the watermark and/or the polarity characteristic are not changing (e.g., the watermark and/or the polarity characteristics of the watermark are not changing from video frame to video frame).

Referring back to FIG. 1, the watermarking generation module 104 input and color conversion modules 102 and 110 are communicatively coupled to a selector 112. The selector 112 enables the RGB or YUV formats to be supported and non-relevant video data to bypass the watermark generation module.

As shown in FIG. 1, the watermarking detection module 106 also includes conversion modules 120 and 122 communicatively coupled to the selector 124, which is also coupled to the input. The selector 124 enables the RGB or YUV formats to be supported and non-relevant video data to bypass the watermark detection module. In embodiments, the watermark detection module 106 can be communicatively coupled to a watermarking generation module 104, a video processor 116, and/or another component of system 100 using for example, a gigabit multimedia serial link (GMSL) (e.g., coaxial cable or twisted pair).

Figure 6:
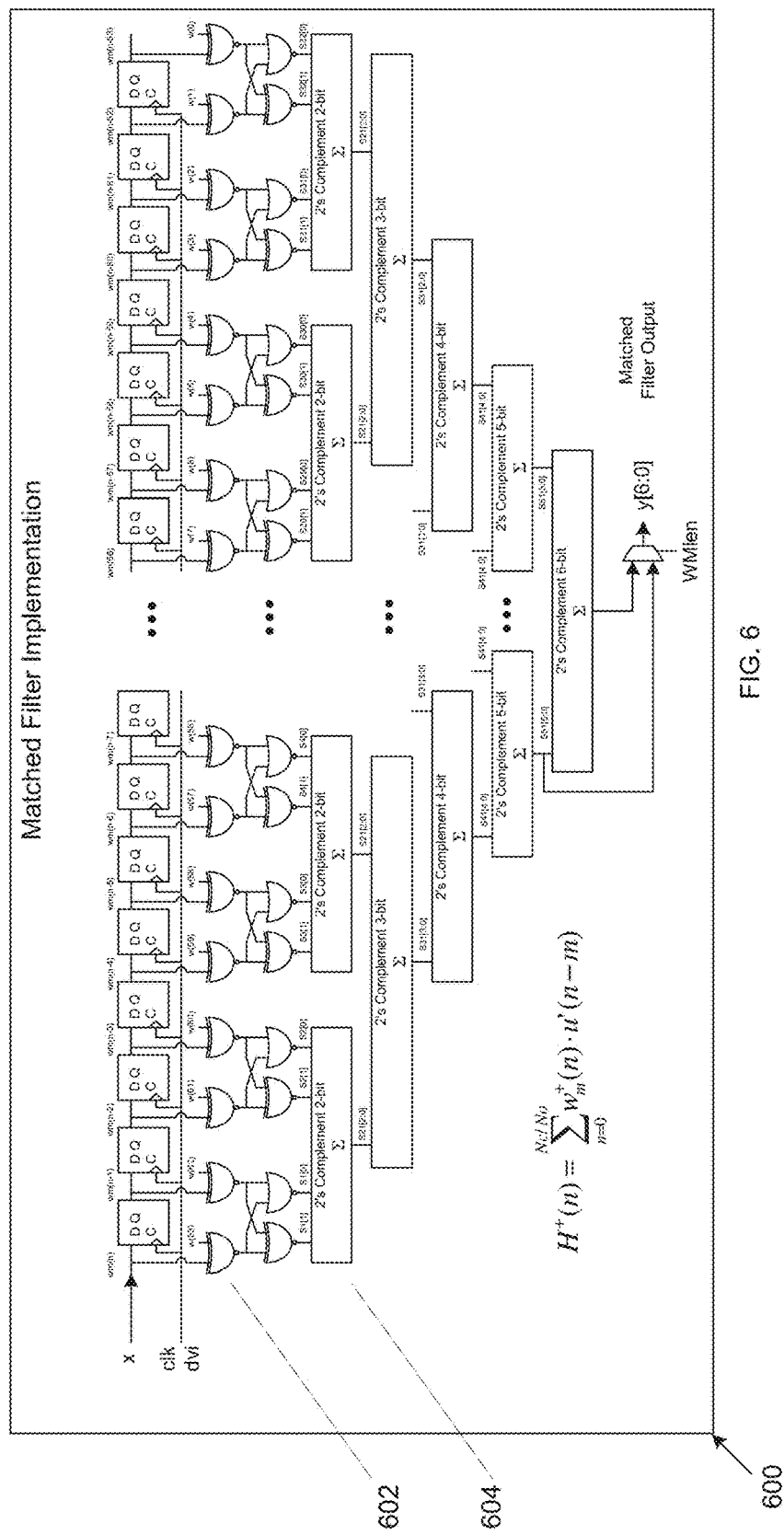
FIG. 6 is a block diagram illustrating matched filter circuitry in accordance with an example implementation of the disclosure.

FIGS. 5 and 6 illustrate example block diagrams for extracting and detecting watermarks embedded within video data via the watermark detection module 106. In one or more implementations, the watermark is extracted 502 from the least significant bits of the Chroma (U or V) portion of the video data. The extracted watermark signal is compared to a defined threshold 506 (e.g., a fixed threshold, a programmable threshold). In some instances, image processing may cause high frequency noise associated with the watermark. As such, the watermark can be oversampled to reduce instances of high frequency noise patterns within the extracted bit stream representing the watermark. In some implementations, a filter, such as a box car filter 508, can be utilized to reduce the detection of high frequency noise patterns during detection (see FIG. 5).

Modification of the captured image (e.g., resizing of the image, re-orientation of the image) may alter the frequency characteristics of the watermark. Thus, a clock and data recovery circuit 512, such as a delay locked loop (DLL), can be utilized to recover the watermark bit stream. As shown in FIG. 5, a bank of clock and data recovery circuits connected in parallel can be utilized within the system 504 to support a range of image modification. Respective clock and data recovery circuits 512 are connected with respective matched filters 514 to detect the watermarks and/or watermark polarity characteristics. However, it is understood that the system 106 may incorporate any number of clock and data recovery circuits and respective matched filters per the requirements of the system 114. In some implementations, the matched filters are implemented utilizing a +1/−1 encoded bit stream to provide a memory and hardware efficient implementation within the system 114. In some implementations multipliers may utilize a single XOR circuit 602 with a minimized adder tree 604 (See FIG. 6).

FIG. 6 illustrates an example implementation of a matched filter 600. In one or more implementations, the matched filter is configured to generate an output signal representative of whether the video frame includes a watermark with a specific basis function and polarity.

Figure 7:
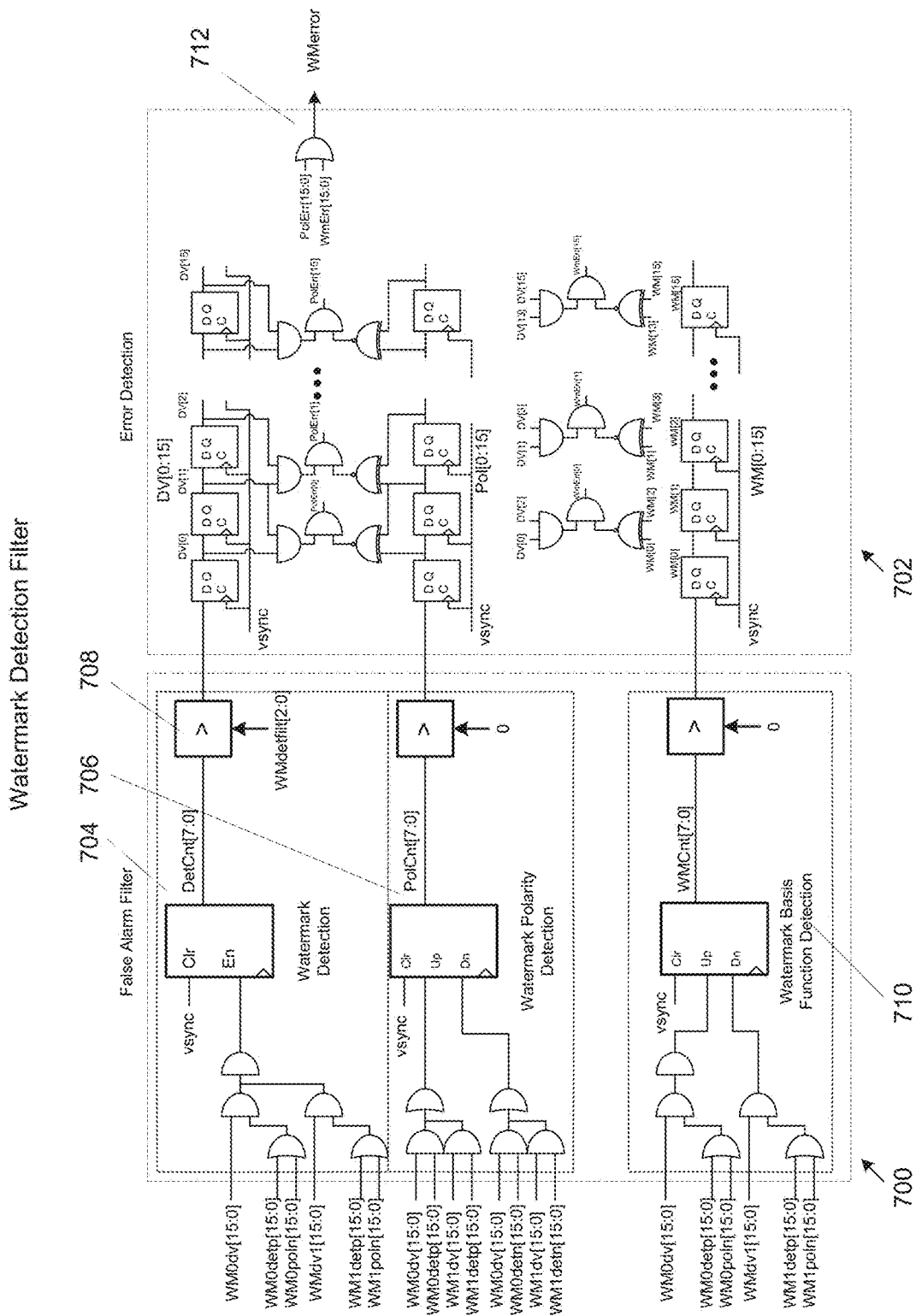
FIG. 7 is a block diagram illustrating error detection circuitry in accordance with an example implementation of the disclosure.

As shown in FIG. 7, in an implementation, the output signals of the matched filters are combined and filtered to minimize generation false alarms. In an implementation, a filter is used to detect the presence of a watermark 704, the polarity of the watermark 706, and the basis function of the watermark 710. The combined output signals may be filtered using counters and/or a programmable threshold 708.

The VSYNC signal (e.g., frame based signal) may be utilized in the error detection processing 702 to determine whether a watermark is present and changing on a frame-to-frame basis. In the event the watermark is present and not changing video frame to video frame, an error signal indicating a non-changing watermark is generated 712. In one or more implementations, the error signal can be utilized to interrupt a processor and/or be utilized to interrupt display of video at a display. For instance, the error signal can be utilized to interrupt display of video frames representing images captured from a backup camera when a safety relevant video stream is frozen (e.g., video stream having watermarks embedded therein). In an implementation, this signal can be used to blank the video stream or display to prevent frozen video data to be displayed to an system operator, In one or more implementations, the SOC 116 may route non-relevant static video streams (e.g. a map) through system 114 but does not generate error signals pertaining to this non-relevant static data because the non-relevant static video streams do not contain a watermark.

Additionally, some video stream/processing systems route the video streams through a video processor 116 for routing multiple sourced videos to different displays. These type of video processing architectures may include multiple video image frame buffers 118 at the input and/or the output. If an error occurs, the output frame buffers 118 may still generate in multiple unique and valid video images. Thus, systems that detect changing CRCs of the image or portions of the frame may not detect a data interruption when multiple valid repeated image data is processed. The system 114 is configurable to utilize more watermarks than the number of video frame buffers within the processor. Utilization of these watermarks allows detection even if the frame based processing has been interrupted. For instance, if a video frame processing system has a double frame buffer, and the generator is configured to generate four (4) unique watermarks, the output detection process described above detects that the watermark basis function is not spanning the generated four (4) watermark functions.

Additionally, other video stream/processing systems may significantly modify the data representing the originally captured image(s). For instance, image cropping may remove or move modified pixels that contain unique identifiers, such as image counters.

As described above, the present disclosure describes embedding watermarks into relevant video frames. The spatial watermark can be oversampled such that if the image is resized the basis function can still be detected in the altered image. For example, the filtering and data recovery circuitry described above enables detection of the watermark. Additionally, oversampling of the watermark also enables the system 114 to detect the watermark in the event of an image rotation. The spatial watermark is symmetric and redundant. For instance, symmetry may provide for detection of the watermark in the event of vertical or horizontal flipping of the image, and redundancy may enable detection of a watermark within image altered by cropping and/or video overlays. For instance, the spatial watermark may be shorter than the image row and may be embedded within every row. Additionally, the system 114 may employ a configurable gain (e.g., programmable gain corresponding to the watermark) and a configurable oversampling rate (e.g., programmable oversampling rate for sampling the watermark). In some instances, the gain and the oversampling rates comprise a fixed gain and a fixed oversampling rate.

The system 114 also utilizes the redundancy to filter the detections of a changing watermark. For instance, detection of the watermark may comprise row and frame based processing. Also, utilizing a defined threshold for the matched filter(s) may minimize false alarms, and the watermark detection counters enable frame based dissemination for which the basis function was detected. The system 114 does not require line or frame buffers.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Certain implementations are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example implementations, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some implementations, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In implementations in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

What is claimed is:

1. A system for detecting frozen video streams comprising:
    a watermarking generator at a video source; and
    a watermark detector communicatively coupled to the watermarking generator, the watermark detector configured to receive a plurality of watermarks, the watermark detector configured to determine whether a watermark embedded in a current video frame of a plurality of video frames is different from a watermark embedded in a previous video frame of the plurality of video frames, the watermark detector configured to generate an error signal when the watermark embedded in the current video frame is not different from the watermark embedded in the previous video frame, wherein the watermark detector is further configured to determine whether a polarity characteristic of the watermark embedded in a current video frame of the plurality of video frames differs from a polarity characteristic of the watermark embedded in a previous video frame of the plurality of video frames, the watermark detector configured to generate an error signal when the polarity characteristic of the watermark embedded in the current video frame is not different from the polarity characteristic of the watermark embedded in the previous video frame.

2. The system as recited in claim 1, wherein the watermark generator is configured to generate a watermark based upon a time varying watermark basis function and embed the watermark into a Chroma portion of the plurality of video frames.

3. The system as recited in claim 2, wherein the watermark is embedded into at least one least significant bit (LSB) of the Chroma portion.

4. The system as recited in claim 1, wherein the video frame comprises a YUV video frame.

5. The system as recited in claim 4, further comprising a first converter configured to receive a Red-Green-Blue (RGB) video frame and convert the RGB video frame to a corresponding YUV video frame.

6. The system as recited in claim 5, further comprising a second converter configured to receive the YUV video frame and convert the YUV video frame into a corresponding RGB video frame.

7. The system as recited in claim 1, wherein the watermark comprises a programmable watermark.

8. The system as recited in claim 1, wherein the watermark comprises a horizontally symmetric watermark.

9. The system as recited in claim 1, wherein the watermark comprises a vertically symmetric watermark.

10. The system as recited in claim 1, wherein the watermark basis function is oversampled.

11. The system as recited in claim 1, wherein the watermark detector utilizes a clock and data recover circuit.

12. The system as recited in claim 1, wherein the watermark detector utilizes matched filters.

13. The system as recited in claim 1, wherein the watermark detector utilizes a matched filter implemented with single bit data encoding.

14. The system as recited in claim 1, wherein the watermark detector is configured to combine row based detections and thresholding on a frame basis to minimize false alarms.

15. The system as recited in claim 1, wherein the watermark detector is configured to utilize a frame based proceeding to generate an alarm if detected watermarks do not span at least one of a watermark basis function set or a polarity.

16. The system as recited in claim 1, wherein the watermarking generator and the watermark detection module operate in at least one of the Red-Green-Blue (RGB) color space or the YUV color space.

17. A system for detecting frozen video streams comprising:
   a watermarking generator at a video source, the watermarking generator including a first converter configured to receive a Red-Green-Blue (RGB) video frame and convert the RGB video frame to a corresponding YUV video frame; and
   a watermark detector communicatively coupled to the watermarking generation module, the watermark detector configured to receive a plurality of watermarks, the watermark detector configured to determine whether a watermark embedded in a current video frame of a plurality of video frames is different from a watermark embedded in a previous video frame of the plurality of video frames, the watermark detector configured to generate an error signal when the watermark embedded in the current video frame is not different from the watermark embedded in the previous video frame, the watermark detector including a second conversion module configured to receive the YUV video frame and convert the YUV video frame into a corresponding RGB video frame, wherein the watermark detector is further configured to determine whether a polarity characteristic of the watermark embedded in a current video frame of the plurality of video frames differs from a polarity characteristic of the watermark embedded in a previous video frame of the plurality of video frames, the watermark detector configured to generate an error signal when the polarity characteristic of the watermark embedded in the current video frame is not different from the polarity characteristic of the watermark embedded in the previous video frame.

18. The system as recited in claim 17, wherein the watermark detector utilizes a clock and data recover circuit.

19. A system for detecting frozen video streams comprising:
   a watermarking generator at a video source, the watermarking generator configured to generate a watermark based upon a time varying watermark basis function and embed the watermark into a Chroma portion of a plurality of video frames; and
   a detector communicatively coupled to the watermarking generator, the detector configured to receive a plurality of watermarks, the detector configured to determine whether a watermark embedded in a current video frame of the plurality of video frames is different from a watermark embedded in a previous video frame of the plurality of video frames, the detector configured to generate an error signal when the watermark embedded in the current video frame is not different from the watermark embedded in the previous video frame, the detection module including a second conversion module configured to receive the YUV video frame and convert the YUV video frame into a corresponding RGB video frame, wherein the detector is further configured to determine whether a polarity characteristic of the watermark embedded in a current video frame of the plurality of video frames differs from a polarity characteristic of the watermark embedded in a previous video frame of the plurality of video frames, the detector configured to generate an error signal when the polarity characteristic of the watermark embedded in the current video frame is not different from the polarity characteristic of the watermark embedded in the previous video frame.

* * * * *